June 20, 1967           W. W. WILSON           3,325,926
DIGGER TOOTH AND ASSEMBLY FOR AN EXCAVATING APPARATUS
Filed March 9, 1964           3 Sheets-Sheet 1
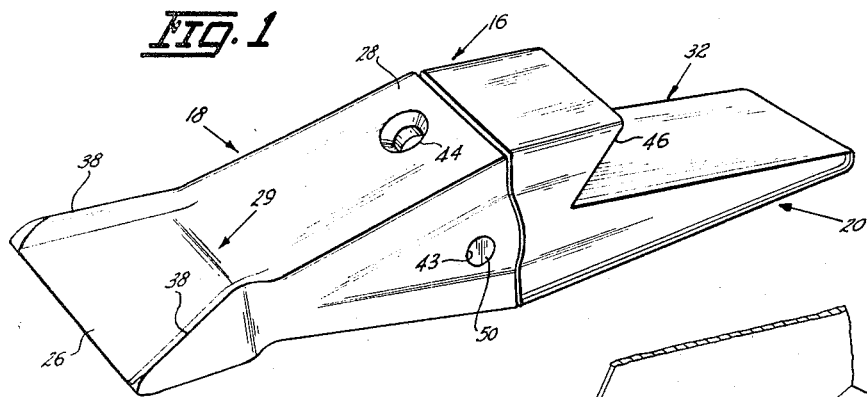
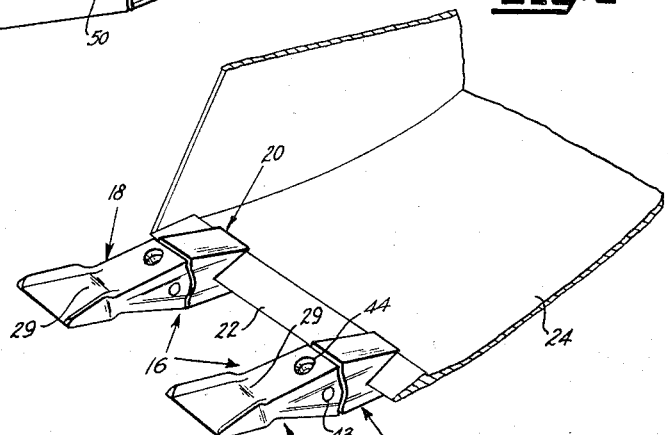
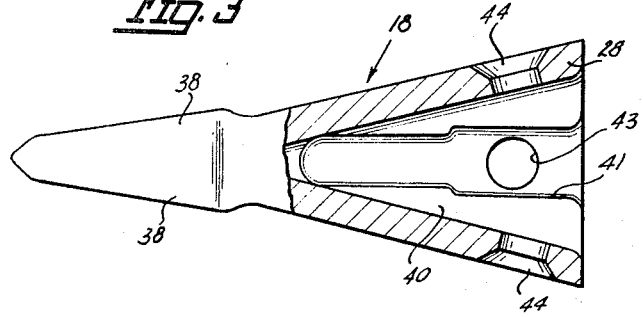
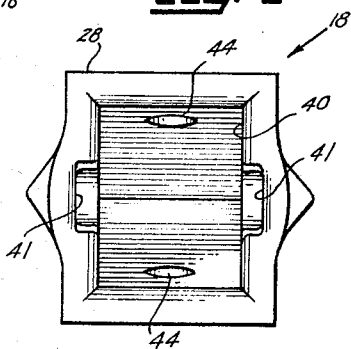
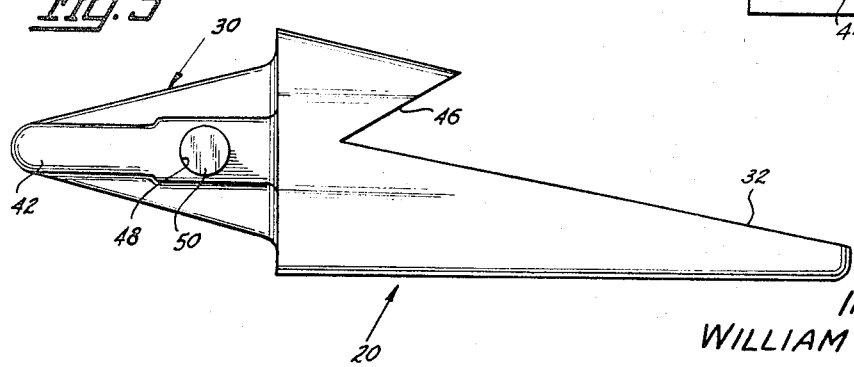
INVENTOR.
WILLIAM W. WILSON
BY *Morton L. Adler*
ATTORNEY.

June 20, 1967 W. W. WILSON 3,325,926
DIGGER TOOTH AND ASSEMBLY FOR AN EXCAVATING APPARATUS
Filed March 9, 1964 3 Sheets-Sheet 2
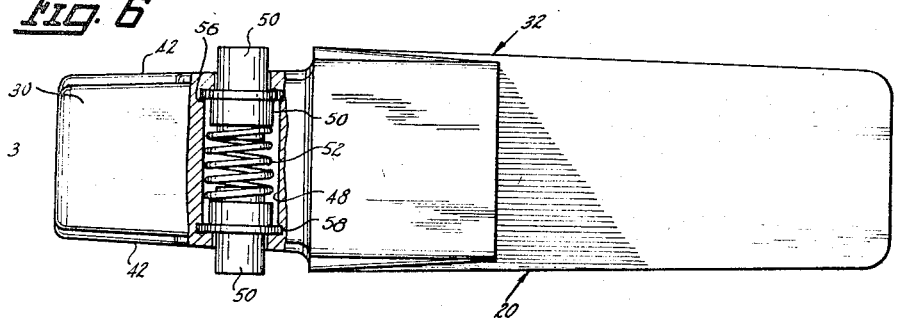
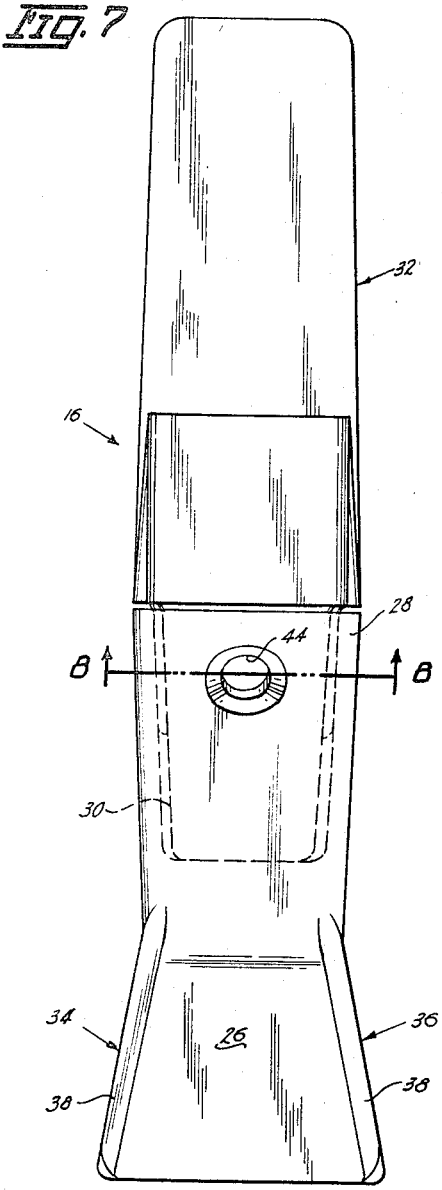
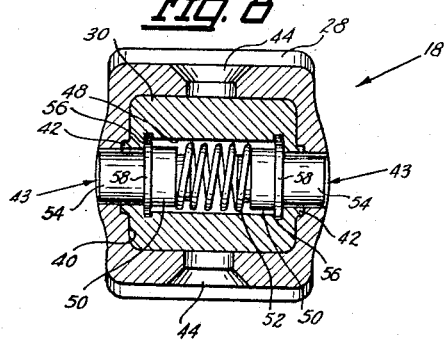
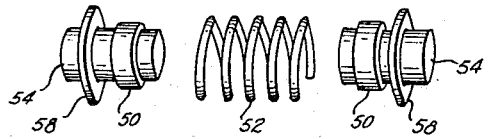
INVENTOR.
WILLIAM W. WILSON
BY
ATTORNEY.

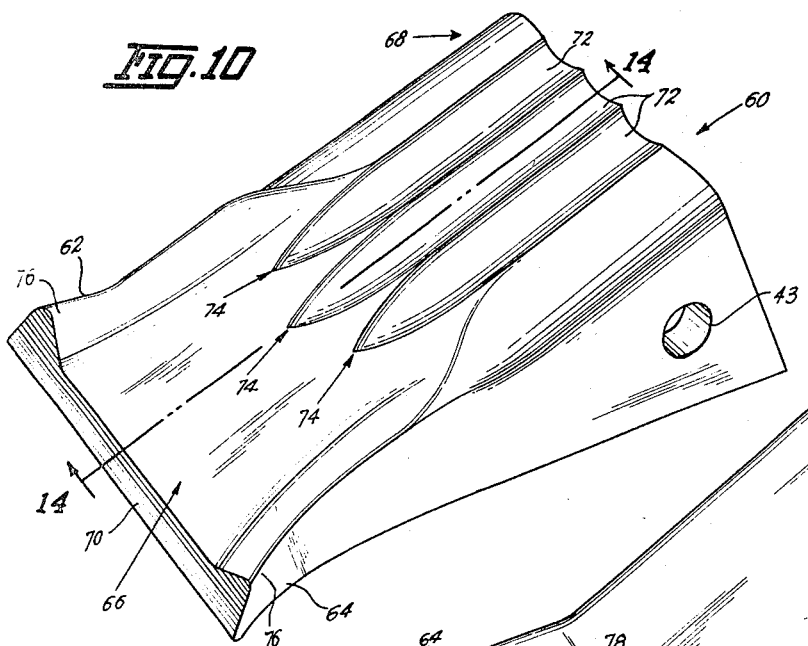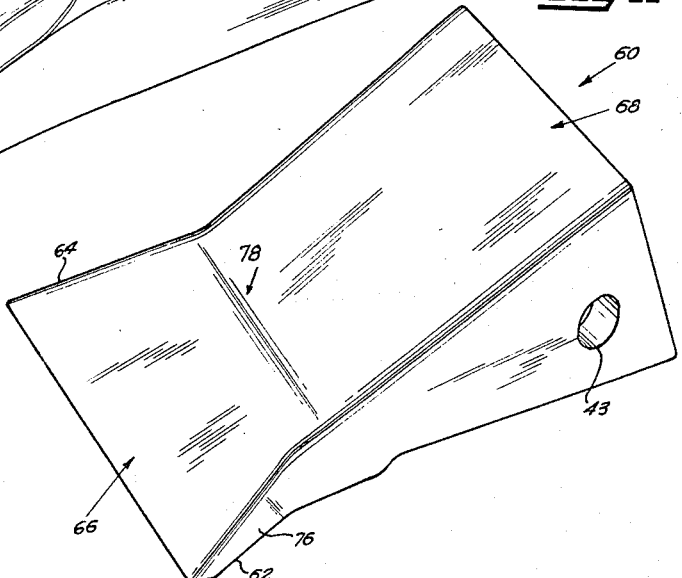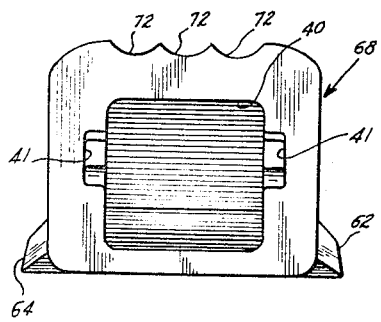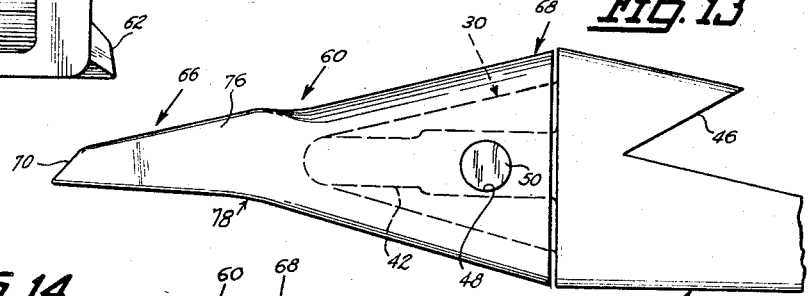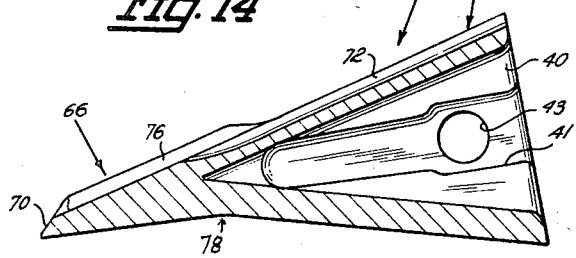

United States Patent Office 3,325,926
Patented June 20, 1967

3,325,926
DIGGER TOOTH AND ASSEMBLY FOR AN
EXCAVATING APPARATUS
William W. Wilson, Shreveport, La., assignor, by mesne assignments, to Mid-Continent Steel Casting Corporation, a corporation of Louisiana
Filed Mar. 9, 1964, Ser. No. 350,385
10 Claims. (Cl. 37—142)

This invention relates to a digger tooth and its associated assembly for use with excavating apparatus such as power shovels, backhoes, clam diggers, drag lines, ditching machines and the like.

One of the important objects contemplated by this invention is the provision of an improved tooth design for materially increasing the efficiency thereof in excavation work.

Another object herein is to provide an improved means for easily and quickly releasably securing this digger tooth to excavating apparatus of the type above characterized so that replacement of a worn or broken tooth may be accomplished in relatively little time and with relatively little expense and effort.

A further object of this invention is the provision of a digger tooth for an excavating apparatus which is sturdy and durable in construction, reliable and efficient in operation, and relatively simple and inexpensive to manufacture, assemble, utilize and maintain.

Still another object of the instant invention is the provision of a digger tooth assembly of the above class wherein the use of a plurality of teeth in accordance with the instant inventive concept, secured to the cutting edge of an excavating apparatus bucket will decrease wear on the cutting edge itself while increasing the ease with which the bucket enters the material being excavated.

A still further object of this invention is to provide a digger tooth of the type described having a forward portion which extends in front of the cutting edge of the excavating apparatus bucket and is substantially wedge-shaped, having sides which flare outwardly whereby the forward portion of the tooth is the portion of greatest width thereby facilitating entry of the bucket into the material being excavated and relieving friction wear and deplating of metal on the bucket and the tooth.

A further important object of this invention is to provide a digger tooth as characterized and having ribs or flanges extending upwardly and downwardly along each of the flared sides of the same to control wear on the outside edge of the piercing point and to create relief for piercing the earth, rock or the like being excavated by the bucket.

Another object inherent in this invention is the provision of a modified form of digger tooth having the basic design features as above set forth and having, in addition, improved features for increasing the efficiency of the tooth when digging into rocky material.

To attain these objects and such further objects as may appear herein, or be hereinafter pointed out, reference is made to the accompanying drawings forming a part hereof, in which:

FIG. 1 is a perspective view showing a preferred embodiment of this new digger tooth and associated assembly, FIG. 2 is a reduced perspective view of a fragmentary portion of a bucket of any conventional excavating apparatus showing a plurality of tooth assemblies in accordance with the instant inventive concept carried by the cutting edge of the same in laterally spaced relationship, FIG. 3 is a side elevational view of this digger tooth shown partially in section to better illustrate its construction, FIG. 4 is a rear elevational view of the tooth shown in FIG. 3, FIG. 5 is a side elevational view of the tooth assembly adapted for attachment to the excavating apparatus and for releasably supporting the tooth of FIG. 3, FIG. 6 is a top plan view of the part shown in FIG. 5 with a portion cut away to illustrate the tooth securing pin assembly, FIG. 7 is a top plan view of the device shown in FIG. 1, FIG. 8 is a cross-sectional view taken on the line 8—8 of FIG. 7, FIG. 9 is an exploded perspective view of the spring loaded pin assembly shown in FIG. 8, FIG. 10 is a top perspective view of my modified tooth adapted for use in rocky material, FIG. 11 is a bottom perspective view of the tooth in FIG. 10, FIG. 12 is an elevaational back view of the tooth in FIG. 10, FIG. 13 is a side elevational view of the tooth in FIG. 10 shown with a fragmentary portion of the supporting structure as illustrated in FIG. 5, and FIG. 14 is a cross-sectional view taken on the line 14—14 of FIG. 10.

Referring to the drawings, the entire tooth assembly is designated generally by the numeral 16 and comprises the digger tooth member 18 and the adapter or supporting member 20. A pair of assemblies 16 are illustrated in their operational environment in FIG. 2 where adapter 20 is shown suitably secured to the cutting edge 22 of a bucket 24 that is shown only in fragment and forms a part of any conventional excavating apparatus (not shown).

The tooth 18 includes the forward portion 26 and the rear portion 28 with the longitudinal plane of both the top and bottom sides of such tooth defining a low point 29 intermediate the forward cutting edge portion 26 and the rearmost edge of portion 28. Point 29 may be the low point of a slight concavity formed in the longitudinal plane of the top and bottom sides of tooth 18 or it may be the low point of inclined top and bottom sides extending from the respective extremities of the tooth 18 to point 29 and is designed to keep the tooth member 18 sharp by relieving friction wear on the penetrating cutting edge. The adapter or support 20 also has the respective forward and rear portions 30 and 32. The forward portion 26 of the tooth member 18 is substantially wedge-shaped as best seen in FIG. 3 and includes side edges 34, 36 which flare outwardly to define the widest portion of the tooth member 18. Upwardly and downwardly extending flange elements or ribs 38 are perpendicular to edges 34 and 36 and are integrally formed with, or secured to such edges.

The rearward portion 28 of the tooth member 18 defines a recess 40 which substantially conforms in configuration to the shape of the forward portion 30 of the adapter member 20 so that portion 30 can be nested within recess 40 as shown. In this regard channels 41 are provided at opposite sides of recess 40 (FIG. 4) to receive the ribs 42 (FIG. 6) on portion 30 of adapter 20 and thereby add to the rigidity of support for tooth member 18. A pair of opposed apertures 43 are defined in the rearward portion 28 of the tooth member 18 in communication with the recess 40 for a purpose to be described in more detail hereinafter. Top and bottom countersunk bores 44 may be provided in the rearward portion 28 of the tooth member 18 to allow the same to be secured to shanks currently in use on buckets of various excavating apparatuses in a well-known manner.

The rearward portion 32 of the adapter member 20 defines an undercut 46 substantially conforming in configuration to the shape of the cutting edge 22 of the bucket 24 and receiving the cutting edge 22 as seen in FIG. 2 where it will be appreciated that a substantial portion of the adapter member extends beneath the cutting edge and is secured thereto in any conventional manner as by welding, bolts or the like.

A transverse bore 48 is defined through the forward portion 30 of the adapter element 20, the bore 48 being aligned with the apertures 43 when the forward portion 30 of the adapter member 20 is received in the recess 40 in the rearward portion 28 of the tooth member 18. A pair of locking pins 50 are slidingly received in the bore 48 with a spring means 52 therebetween to normally urge the locking pins 50 outwardly to bias the reduced diameter detents 54 carried by the locking means 50 into the apertures 43 thereby securely retaining the tooth member 18 on the adapter member 20. Recesses or counterbores 56 are provided at the two ends of the transverse bore 48 to receive lock rings 58 which slide over the detents 54 so as to maintain pins 50 in bore 48 as seen particularly in FIG. 8.

The use and operation of the tooth assembly 16 of the instant invention will now be apparent. The adapter member 20 is secured in any conventional manner to the cutting edge 22 of the bucket 24 extending into the undercut 46 in the rearward portion 32 of the same. Tooth member 18 may be readily secured to the adapter member 20 by pressing the locking pins 50 inwardly against the spring means 52 so that the detents 54 are recessed within the bore 48 at least flush with the outer surface of ribs 42 and the forward portion 30 of adapter 20 can then be slid into recess 40 with ribs 42 seating in channels 41 where the detents 54 are biased into the apertures 43 when the bore 48 is in register therewith to securely lock the tooth member 18 to the adapter member 20. Removal of the tooth member 18 may be readily accomplished by inward pressure on the detents 54 against the spring means 52 to free the same from the apertures 43 so that the forward portion 30 of the adapter member 20 may be removed from the recess 40. As explained hereinabove, the wedge shape of the forward portion 26 of the tooth member 18 and the ribs or flange elements 38 extending perpendicularly upwardly and downwardly along their flared sides 34 and 36 materially increase the efficiency of the excavating operation and decrease the wear on the cutting edge 22 of the bucket 24 and on the tooth assemblies 16 themselves. In this regard it has been convincingly demonstrated in field tests that the wedge shape flanged tooth will dig more efficiently and substantially faster than conventional teeth not having these improved features.

Referring now to FIGS. 10–14, a modified form of the tooth member 18 described above is designated generally by the numeral 60 and is designed for interchangeable attachment to adapter 20 so that like numerals will be given to like parts wherever the same is indicated. Tooth member 60 is generally wedge shape similarly as member 18 as is clearly shown in the drawings and also includes the flared side edges 62 and 64 on its forward portion 66. The rear portion 68 is provided with the recess 40, channels 41 and apertures 43 the same as tooth member 18.

The forward portion 66 on the top side (FIG. 1) is substantially coplanar and terminates at its leading end in the beveled cutting edge 70. The rear portion 68 on the top side is provided with a plurality or longitudinal adjacent grooves 72 which define a scalloped surface across portion 68 as best seen in FIG. 12. The forwardmost ends of grooves 72 converge as at 74 and it will be noted that point 74 on the center groove extends the furthest toward edge 70 with points 74 on adjacent grooves being at successive rearward points relative to edge 70. Grooves 72 provide additional contact surface and considerably expedite the release of dug materials from the tooth so that such material will easily slide or move into the excavating apparatus to which the tooth is attached. Upwardly extending perpendicular flanges 76 are provided on the edges of sides 62 and 64 similar to the upper portion of flanges 38 on tooth member 18, and the bottom side of portion 66 (FIG. 11) defines a concavity 78 similar to 29 on member 18.

Tooth member 60 is releasably attachable to adapter 20 (FIG. 13) in the same manner as described previously for member 18. It will be appreciated that member 60 has substantially the same flared flanged end characteristics of member 18 and the additional features relative to the top and bottom sides have adapted it particularly as a most efficient working tool in rocky materials.

From the foregoing, it is thought a full understanding of the construction and operation of this invention will be had and the advantages of the same will be appreciated.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. A digger tooth adapted for removable attachment to the cutting edge of an excavating apparatus, said tooth comprising:
   a wedge shaped tooth having a forward and rear portion and a top and bottom side,
   means for releasably securing said rear portion to the cutting edge of an excavating apparatus,
   said forward portion having side edges which flare outwardly whereby said forward portion is the portion of said tooth with the greatest width,
   the longitudinal plane of said forward portion on said top side defining a point of concavity intermediate its length,
   an upstanding flange on each side of said forward portion perpendicular to said side edges, and
   the top edge of said flange rising in a curved path from the forward edge of said forward portion to a point above the plane of said rear portion and then descending to the plane of said rear portion substantially at said point of concavity.

2. A digger tooth adapted for removable attachment to the cutting edge of an excavating apparatus, said tooth comprising:
   a wedge shaped tooth having a forward and rear portion and a top and bottom side,
   means for releasably securing said rear portion to the cutting edge of an excavating apparatus,
   said forward portion having side edges which flare outwardly whereby said forward portion is the portion of said tooth with the greatest width,
   the longitudinal plane of said forward portion on said bottom side defining a point of concavity intermediate its length,
   a depending flange on each side of said forward portion perpendicular to said side edges, and
   the bottom edge of said flange descending in a curved path from the forward edge of said forward portion to a point below the plane of said rear portion and then returning to the plane of said rear portion substantially at said point of concavity.

3. A digger tooth adapted for removable attachment to the cutting edge of an excavating apparatus, said tooth comprising:
   a wedge shaped tooth having a forward and rear portion,
   means for releasably securing said rear portion to the cutting edge of an excavating apparatus, and
   a flange on each forward portion side edge inclined upwardly from the forward edge of said forward portion to a point above the plane of said rear portion and then inclined downwardly to the plane of said rear portion.

4. A digger tooth adapted for removable attachment to the cutting edge of an excavating apparatus, said tooth comprising:

a wedge shaped tooth having a forward and rear portion, means for releasably securing said rear portion to the cutting edge of an excavating apparatus, and a flange on each forward portion side edge inclined downwardly from the forward edge of said forward portion to a point below the plane of said rear portion and then inclined upwardly to the plane of said rear portion.

5. A digger tooth adapted for removable attachment to the cutting edge of an excavating apparatus, said tooth comprising:

a wedge shaped tooth having a forward and rear portion, said forward portion having side edges which flare outwardly whereby said forward portion is the portion of said tooth with the greatest width, means for releasably securing said rear portion to the cutting edge of excavating apparatus, said means comprising:

an adapter having a forward and rear portion, said rear portion being fixedly secured to said cutting edge, said forward portion including means for removable attachment to the rear portion of said adapter, the rear portion of said tooth defining a recess, said tooth being provided with a pair of opposed registering apertures in the rear portion thereof and in communication with said recess, the forward portion of said adapted substantially conforming in configuration to the shape of said recess so as to nest therein, spring loaded detents on opposed sides of the forward portion of said adapter each engageable with said tooth through said respective apertures, and said tooth being removable from said adapter only by compressing both of said detents simultaneously out of engagement with said tooth.

6. A digger tooth adapted for removable attachment to the cutting edge of an excavating apparatus, said tooth comprising:

a wedge shaped tooth having a forward and rear portion and a top and bottom side, means for releasably securing said rear portion to the cutting edge of an excavating apparatus, said forward portion having side edges which flare outwardly whereby said forward portion is the portion of said tooth with the greatest width, and said top side of said rear portion being provided with a plurality of longitudinal parallel grooves the rear ends of which communicate with the rear edge of said rear portion and the forward ends terminate near said forward portion.

7. A tooth as defined in claim 6 including a flange on each flared side edge extending upwardly relative to said forward portion.

8. A tooth as defined in claim 6 wherein the longitudinal plane of said forward portion on said bottom side defines a point of concavity intermediate its length.

9. A tooth as defined in claim 6 wherein the forward ends of each groove converge to a pointed end.

10. A tooth as defined in claim 6 wherein the substantially centermost groove relative to opposed sides of said tooth is greater in length than said other grooves and successive grooves on each side of said centermost groove are progressively shorter.

References Cited

UNITED STATES PATENTS

| 895,370 | 8/1908 | Hendershot et al. | |
|---|---|---|---|
| 1,395,048 | 10/1921 | McKee | 37—142 |
| 1,427,610 | 8/1922 | McKee | 37—142 |
| 1,522,860 | 1/1925 | Boots | 37—142 |
| 1,909,850 | 5/1933 | Younie | 37—142 |
| 2,247,202 | 6/1941 | Ratawski | 37—142 |
| 2,689,419 | 9/1954 | Daniels et al. | 37—142 |
| 2,740,212 | 4/1956 | Werkheiser et al. | 37—142 |
| 2,852,874 | 9/1958 | Grubb | 37—142 |

ABRAHAM G. STONE, *Primary Examiner.*

WILLIAM A. SMITH III, *Examiner.*